April 9, 1957  B. E. TUCKER  2,787,838
VERTICAL INDICATOR

Filed June 22, 1953  2 Sheets-Sheet 1

INVENTOR.
BURL E. TUCKER
BY Burton & Parker
ATTORNEYS

April 9, 1957   B. E. TUCKER   2,787,838
VERTICAL INDICATOR
Filed June 22, 1953    2 Sheets-Sheet 2
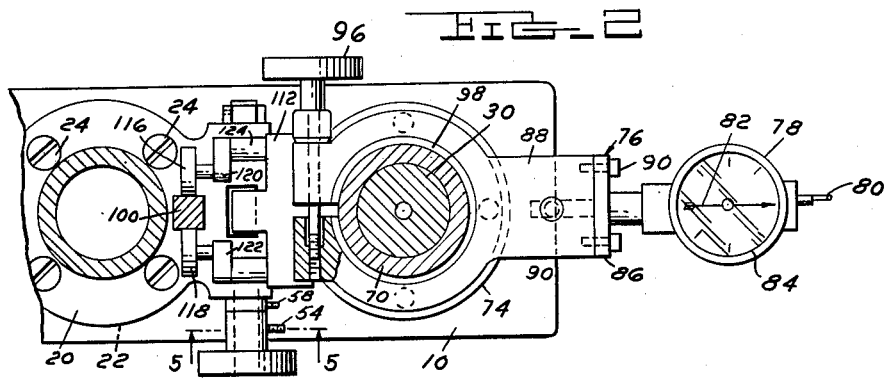
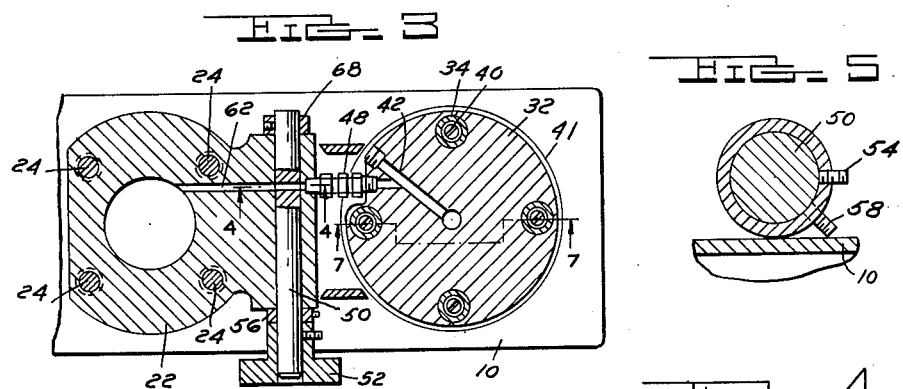
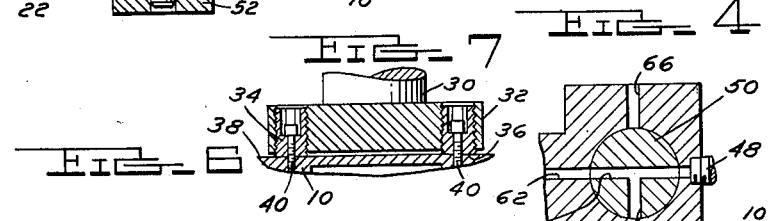
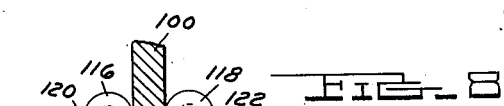
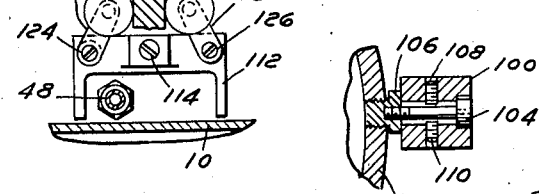
INVENTOR.
BURL E. TUCKER
BY
Burton & Parker
ATTORNEYS

United States Patent Office 2,787,838
Patented Apr. 9, 1957

2,787,838

VERTICAL INDICATOR

Burl E. Tucker, Royal Oak, Mich.

Application June 22, 1953, Serial No. 363,128

2 Claims. (Cl. 33—174)

This invention relates to improvements in apparatus for testing and measuring the angularity of surfaces with respect to a predetermined plane and particularly to a precision instrument for reflecting minute variations on a surface from a true condition of angularity and perpendicularity.

For accurate machine work, it has been the practice to employ try-squares for testing and measuring surfaces of a given piece of work to determine whether such surfaces extend truly vertically or perpendicularly or at any predetermined angle. It has been suggested in the past that try-squares be provided with a movable indicating member for facilitating such measurements, as for example, the indicating instrument disclosed in the United States patent to Jansch et al. No. 1,345,597. Such instruments, including that disclosed in the aforesaid patent, require the operator to manually hold the try-square and manually move the indicating member, and the necessity for putting the hands of the operator on the instrument would disturb the accurate setting of the parts and prevent precise measurements from being obtained. In addition, variations in the temperature also affect the parts of such instruments. In a try-square, the off-set relation of the vertical side to the horizontal side made the instrument susceptible to temperature changes which, although very slight, would immeasurably alter the intended true right-angular relationship between the two sides.

An important object of this invention is the provision of a precision instrument that will measure minute inaccuracies on surface portions of work pieces and gauges throughout a considerable distance along a straight line and determine if these surface portions along such line extend in true vertical planes or in planes parallel to a predetermined inclined plane.

Another object is the provision of a precision instrument that movably supports a precision indicator for travel in a vertical or inclined plane with the indicator mounted for adjustable movement swingably about and linearly along an axis lying in such planes.

A further object of this invention is the provision of a vertical indicator instrument having a base member adapted to rest upon a true horizontal table and exhibiting an upstanding angularly adjustable pillar which is adjustable upon the base to lie with its longitudinal axis at a determined inclination with respect to said true horizontal table, and with a reciprocable indicator carrier cylinder telescopically received over the pillar and movable thereon to support an indicator for movement in a plane parallel to the longitudinal axis of the pillar.

A still further object is the provision of a vertical indicator having a vertically reciprocable indicator carrier cylinder received over an upstanding pillar with a vertically extending adjustable guide rail disposed adjacent the cylinder and coupled thereto by a follower mechanism, with said rail and follower mechanism adapted to guide an indicator carried by the cylinder along a true vertical line or a line of determined inclination with respect to a true vertical line.

A meritorious feature of the invention is the provision of a precision instrument having a hollow upstanding piston angularly adjustably mounted upon a base member with a cylinder member telescoped over the piston for reciprocable movement with respect thereto, and an indicator gauge swingably mounted upon the cylinder and movable linearly with respect to the cylinder and adjustable to determined positions thereon.

A meritorious feature of the invention is the provision of a vertically movable precision indicator with fluid pressure means for moving and supporting the same, and guide mechanism for insuring the movement of the indicator along a straight line.

Various other objects, advantages and meritorious features of the invention will become more fully apparent from the following specification, appended claims and accompanying drawings, wherein:

Fig. 2 is a horizontal cross sectional view through the piston, cylinder and air chamber of the instrument of Fig. 1 taken along line 2—2 thereof;

Fig. 3 is a fragmentary sectional view taken along line 3—3 of Fig. 1 and illustrating the mounting blocks of the piston and air chamber;

Fig. 4 is an enlarged vertical fragmentary sectional view taken on line 4—4 of Fig. 3 through the valve and illustrating the pressure supplying position of the valve;

Fig. 5 is a cross sectional view through a part of the valve handle taken along line 5—5 of Fig. 2;

Fig. 6 is an enlarged vertical fragmentary sectional view through a part of the guide rail follower mechanism;

Fig. 7 is a cross sectional view taken on line 7—7 of Fig. 3 and showing the adjustable character of the mounting block for the piston, and Fig. 8 is a vertical cross sectional view taken on line 8—8 of Fig. 1 and showing the adjustable character of the guide rail.

Figure 1:
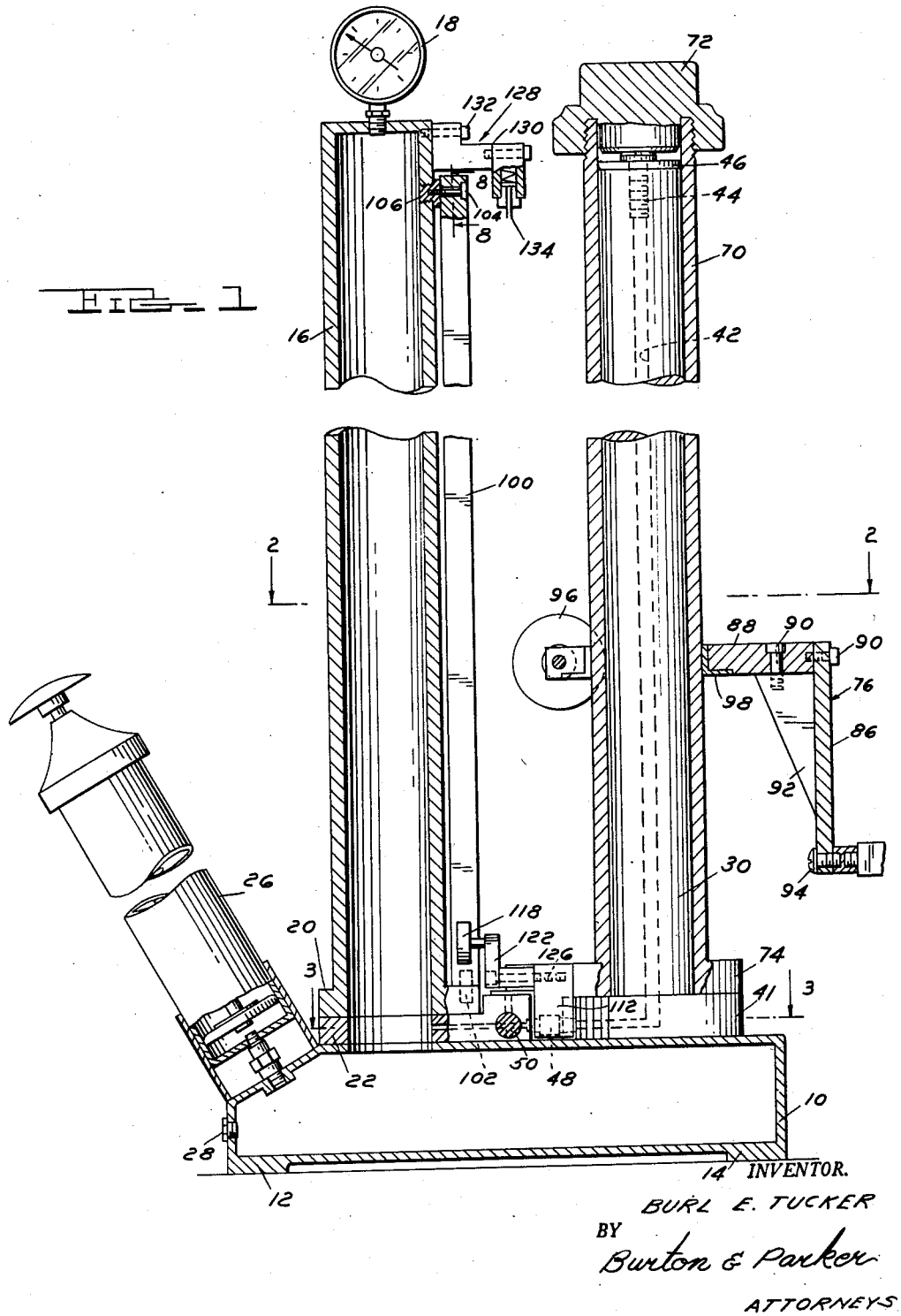
Fig. 1 is a vertical sectional view through an instrument embodying the invention.

Referring particularly to the drawings, an illustrated embodiment of the invention generally comprises a hollow base portion indicated at 10 having two shoulders or legs 12 and 14 adapted to support the base. The lower surfaces of the legs are ground flat to lie in a common plane and support the base upon a lapped-surface layout table. An upright air chamber 16 is mounted on the base and communicates with the interior thereof. An air pressure gauge 18 is mounted atop the chamber and communicates with the interior thereof.

The lower end of the chamber exhibits a flange portion 20 which is adapted to seat upon the chamber supporting block 22 resting upon the base. As shown in Figs. 2 and 3, four similarly numbered screw members 24 secure the flange and block to the base.

Adjacent the air chamber and mounted on an inclined end of the base is the hand operable air pump 26 of a conventional design and adapted to supply air under pressure to the air chamber, hollow base and other hereinafter mentioned portions of the instrument. A removable plug 28 disposed in the end of the base is adapted to permit the coupling with the base of an air pressure hose to supply air to the instrument in lieu of the pump 26.

Upstandingly mounted on the base adjacent the air chamber is a cylindrical pillar or piston 30 shown particularly in Figs. 1, 2 and 7. This pillar has a polished cylindrical surface and is machined and ground to a determined diameter with tolerances of ± .0000". The lower end of the pillar exhibits an annular flange 32, as shown in Figs. 3 and 7. The lower surface of the flange is ground flat to lie in a plane at right angles to the axis of the pillar. Four similarly numbered counterbored threaded set screws 34 are uniformly spaced around and threadedly received through the flange. The lower ends of these set screws, as at 36, are ground flat at right angles to the axis of the screws and are adapted to rest upon the upper face 38 of the base 10.

Threadedly received within the counterbore of each of the set screws is a screw member 40. Each of such members 40 is in turn threadedly received within the upper face 38 of the base 10. It is apparent that by adjustment of the set screws 34 and screw members 40, the angle of inclination of the pillar may be varied with respect to the base. It is also apparent that if the base 10 is resting upon a layout table having a perfectly flat surface, the pillar may be adjusted to extend upwardly from the base with the axis of the cylinder perpendicular to the flat surface of the layout table. By providing very fine threads on the set screws 34 and threaded members 40 it is possible to adjust the pillar to extend upwardly with its axis lying on a line intersecting the surface of a layout table at 90° ± 0". A cover 41 shown in Figs. 1 and 2 is adapted to fit around the pillar and enclose the flange 32 and the screws 34 so that the adjustment will not be disturbed.

A passageway 42 extends through the pillar and opens out through each end thereof. At the upper end a hollow screw 44 is threadedly received within the passageway with a cup washer 46 disposed between the head of the screw and the upper end of the pillar. The passageway extends at the bottom of the pillar laterally through the flange 32 toward the air chamber and couples at the edge of the flange with a flexible joint generally indicated as 48. The joint communicates with a valve disposed within a portion of the supporting block 22.

The valve comprises a stem 50 with a handle 52 mounted thereon by means of a set screw 54. A washer 56 encircles the stem adjacent the handle and abuts the block 22 and is adjustably mounted on the stem by a set screw 58. By adjusting the handle 52 and washer 56 by means of the set screws, the amount of rotation of the valve stem can be determined.

One portion of the stem 50 is laterally bored as at 60 to provide a passageway through the stem which will communicate with entrance of the joint 48 into the block 22. A passageway 62 in the block communicates with the lateral passage 60 in the stem and the air chamber, when the stem is in the position shown in Fig. 4. A second passage 64 is bored in the stem and communicates with the passage 60. A vertical passage 66 vented to the atmosphere, is adapted to communicate with passage 64 when the valve stem is rotated 180° from the position shown in Fig. 4. A washer 68 mounted on the end of the stem opposite the handle maintains the stem in the proper lineal position relative to the passages 62 and 66 in the supporting block.

Slidably telescopically received over the pillar 30 is an indicator carrier supporting means or cylinder 70. It is closed at its upper end by a weighted cap 72, and is provided at its lower end with an annular flange 74. The inside cylindrical wall of the cylinder is characterized by being micromatically honed to a determined diameter having a tolerance of ± .0002", and lapped to just slidably telescopically fit over the pillar. With such a close fit of the pillar and cylinder, it may be appreciated that any wobble between the two is completely eliminated. This invention contemplates the maximum diameter of a piston and minimum diameter of a cylinder such that the two may still be freely slidably telescoped together, and in the construction of the pillar and indicator carrier cylinder such intention should be in the forefront of a machinist's mind.

The cup washer 46 atop the pillar is adapted to keep compressed air between the top of the pillar and the inside of the cylinder from escaping between the walls of the pillar and cylinder. As may be appreciated, when air is compressed within the pump 26 and forced into the air chamber 16 and hollow base 10, and the valve stem is rotated to the position shown in Fig. 4, the air will pass through passage 42 and be admitted within the cylinder between the cap 72 and the washer 46. When such air is of a sufficient pressure, the cylinder will slide smoothly upwardly, while if the valve stem is rotated 180° from the position of Fig. 4, the air will be vented to the atmosphere and the consequent loss of air pressure within the cylinder will permit it to fall. By regulating the air pressure within the cylinder, the latter will rise or fall at the will of the operator.

Supported by the bracket or indicator carrier 76 upon the cylinder 70 is an indicator 78 which may be of the type adapted to read in ten-thousandths of an inch. The indicator is of the conventional finger operated type; the finger 80 being mechanically coupled to actuate the pointer 80 adapted to sweep the dial face 84 of the indicator.

The bracket 76 is L-shaped in cross section having a depending arm 86 and a horizontal arm 88 joined together by screws 90, and a web 92 to strengthen the bracket. Screws 94 secure the indicator to the depending arm. The horizontal arm enlarges at the free end into a split ring adapted to slidably encircle the cylinder and be held adjustably tensioned thereabout by an adjustment screw 96. A fiber or soft metallic bearing sleeve 98, L-shaped in cross section, encircles the cylinder and fits within the circular opening in the split ring portion of the arm 88.

With the adjustment screw 96 loosened the bracket and indicator may be raised or lowered along the cylinder or rotated to any desired position and thereafter the screw is tightened and the bracket semi-permanently fixed to the cylinder. By virtue of the adjustability of the bracket and indicator upon the cylinder, the instrument is adapted to measure the inclination or evenness of a vertical or inclined surface having a height substantially twice that of the cylinder. This may be accomplished by first lowering the bracket from the position of Fig. 1 to a position wherein the bracket rests upon the shoulder or flange 74 of the cylinder. The adjustment screw 96 is then tightened and with admission of compressed air to the top of the cylinder, the cylinder is raised to the limit of its vertical movement carrying with it the bracket and indicator. During such movement the finger 80 on the indicator has been riding over the vertical surface to be measured, recording its inclination from a true vertical plane, through such height as the cylinder has raised the indicator. The cylinder is then lowered to the starting position and the adjustment screw 96 loosened and the bracket slidably vertically displaced along the cylinder until it abuts the underside of the cap 72, whereupon the adjustment screw is retightened. When the cylinder is now elevated, the indicator will begin to record the deviation in the surface to be measured from the highest point of vertical termination of the previous measurement, and will, upon elevation of the cylinder to its upper limit of travel, therefore indicate the measurement of the vertical surface throughout a height substantially twice the height of the cylinder when in the normal lowered position. In terms of linear measurement, if the cylinder has a height between the flange 74 and the cap 72 of 17 inches, then it is possible to measure throughout the entire height of a vertical surface having a height above the layout table of substantially 34 inches.

So that the indicator finger 80 will travel along a determined straight line while moving across the surface being measured, it is necessary to prevent rotation of the cylinder upon the pillar. To this end, a guide rail 100 is disposed vertically adjacent the air chamber 16. The lower end of the rail is provided with an axial pin 102 received within a recess within the flange 20. The end of the pin bottomed within the recess is slightly tapered (not shown) to fit within a tapered end face at the bottom of the recess. Such fitting of the pin and recess permits slight inclination of the rail while the lower end is held at a fixed point at the flange 20. Such inclination of the rail is adjustably determined in a plane intersecting the axis of the pillar by an adjustment screw 104 threadedly received within the counterbored screw 106 which is in turn threadedly received within the wall of the air chamber. By adjustment of the screws 104 and 106, the upper end of the rail may be moved toward or away from the air chamber. Threadedly received within the guide rail 100 on opposite sides of the screw 104 and adapted to bear thereagainst, are the adjustment screws 108 and 110, as shown in Fig. 8. By adjustment of these latter screws the upper end of the guide rail may be moved in a plane perpendicular to movement accomplished by adjustment of screws 104 and 106.

An inverted U-shaped support 112, mounted by means of a screw 114 upon the flange 74 of the cylinder, is adapted to support two precision roller bearings 116 and 118 upon offset arms 120 and 122, which are adjustably secured to the support 112 by screws 124 and 126. The roller bearings are adapted to lie upon opposite sides of the rail and be adjusted by the screws 124 and 126 to bear thereagainst.

By virtue of the adjustability of the guide rail at its upper end, the rail may be moved to lie in a plane passing through the axis of the pillar 30.

Through the engagement of the rail by the roller bearings, the rotated position of the cylinder upon the pillar is determined, and as the cylinder reciprocates upon the pillar, its rotated position thereon is held constant. When the guide rail lies in a plane of the axis of the pillar, the movement of the finger 80 on the indicator will conform to a line parallel to such plane. When the pillar is adjusted with its axis truly perpendicular to a layout table on which the instrument is resting, then the finger 80 of the indicator will follow a line parallel to such axis, and consequently perpendicular to the layout table.

Therefore it can be seen that very precise measurements in vertical planes can be made. Generally, a standard measurement block (not shown) is placed on the layout table. This block is provided with a face which is truly perpendicular to the layout table. The instrument is then operated with the finger 80 of the indicator travelling over the perpendicular face of the block. The instrument can be adjusted through the aforementioned adjustment screws so that the pointer 82 on the indicator reads a constant value. Thereafter the instrument may be used to measure the vertical face of any piece of work placed upon the layout table. The purpose of the standard measurement block is to initially set the instrument. It is because, through handling of the instrument such as moving it from one layout table to another the initial adjustments may be disturbed, that the various adjustment screws are provided. By virtue of such adjustment means, the instrument may be frequently checked and re-set if any error appears when it is tested against a standard measurement block.

To limit the extent of upward movement of the cylinder a bumper mechanism 128 is provided superjacent the guide rail. Such mechanism comprises an L-shaped arm 130 secured to the air chamber by a convenient fastener 132 and a depending spring-loaded plunger 134 adapted to abut the U-shaped bracket 112 when the cylinder nears the top of its movement. This spring loaded plunger cushions any shock that might otherwise result upon rapid upward movement of the cylinder.

In measuring a work piece having an inclined face, to set the instrument it is only necessary to raise up by wedges or the like either leg 12 or 14 of the base. A standard measuring block having a face inclined to the surface of the layout table by the amount that the face of the work piece is supposed to be inclined, is positioned so that the finger 80 of the indicator contacts the face of the block. Then the leg 12 or 14, whichever is the appropriate one, is raised up by wedges or the like off the table until, upon movement of the cylinder and indicator, the indicator will read a constant value as the finger 80 travels over the face of the measurement block. Thereafter, the instrument will determine the deviation of an inclined face of a work piece from the inclination of the place of the face of the measurement block.

What I claim is:

1. An instrument for indicating variations from a true vertical plane comprising in combination a base, a pillar mounted on said base for universal adjustment with respect thereto, an indicator carrier sleeve telescopically received over said pillar and including a gauge-carrying arm, said cylinder being movable axially and rotatably with respect to said pillar, a fluid pressure cylinder mounted on said base, pressure communicating means between said pressure cylinder and the upper end of said pillar whereby pressure transmitted from said pressure cylinder functions to elevate said sleeve with reference to its supporting pillar, guide means extending from said base in substantial parallelism with said pillar, means for adjusting said guide means into exact parallelism with said pillar, and means rigidly connected with said sleeve and interlockingly engaging said guide means for preventing rotation of the sleeve during axial movement thereof with reference to the pillar.

2. An instrument for indicating variations from a true vertical plane comprising in combination a base, a pillar mounted on said base for universal adjustment with respect thereto, an indicator carrier sleeve telescopically received over said pillar and including a gauge-carrying arm, said cylinder being movable axially and rotatably with respect to said pillar, a fluid pressure cylinder mounted on said base, pressure communicating means between said pressure cylinder and the upper end of said pillar whereby pressure transmitted from said pressure cylinder functions to elevate said sleeve with reference to its supporting pillar, an elongated linear guide rod extending in substantial parallelism to said pressure cylinder, said guide rod being rockably supported in said base and connected with the upper portion of said pressure cylinder by means permitting universal adjustment of the rod, and means rigid with said sleeve and interlockingly engaging said guide rod for preventing rotation of said sleeve with reference to said pillar during relative axial movement between the two.

References Cited in the file of this patent

UNITED STATES PATENTS

| | | |
|---|---|---|
| 598,018 | Severance | Jan. 25, 1898 |
| 1,345,597 | Jantsch | July 6, 1920 |
| 1,455,224 | Paoli | May 15, 1923 |
| 2,059,339 | Green | Mar. 3, 1936 |
| 2,095,059 | Donnelly | Oct. 5, 1937 |
| 2,434,949 | Mueller | Jan. 27, 1948 |
| 2,469,904 | Szuba | May 10, 1949 |
| 2,470,404 | Kloos | May 17, 1949 |
| 2,523,551 | Bauer | Sept. 26, 1950 |
| 2,550,707 | McKinistry | May 1, 1951 |
| 2,571,161 | Poole | Oct. 16, 1951 |